United States Patent [19]

Hubbard

[11] 4,133,166
[45] Jan. 9, 1979

[54] COTTON PICKER BAR LUBRICANT SEAL

[75] Inventor: Arthur L. Hubbard, Des Moines, Iowa

[73] Assignee: Deere & Company, Moline, Ill.

[21] Appl. No.: 773,756

[22] Filed: Mar. 2, 1977

[51] Int. Cl.² ............................................. A01O 46/18
[52] U.S. Cl. ............................................. 56/44; 56/43; 277/95
[58] Field of Search ................. 56/43, 44; 277/17, 95

[56] References Cited

U.S. PATENT DOCUMENTS

| 1,947,198 | 2/1934 | Goble | 277/17 |
|---|---|---|---|
| 2,140,631 | 12/1938 | Johnston | 56/43 |
| 2,810,592 | 10/1957 | Williams | 277/17 |
| 3,092,949 | 6/1963 | Sadler et al. | 56/44 |
| 3,112,113 | 11/1963 | Taylor | 277/95 |
| 3,183,046 | 5/1965 | Hyland | 277/95 |
| 3,195,421 | 7/1965 | Rumsey et al. | 277/95 |
| 3,245,210 | 4/1966 | Hubbard | 56/44 |
| 3,380,791 | 4/1968 | Peck | 277/95 |
| 3,402,538 | 9/1968 | Lester | 56/44 |
| 3,510,182 | 5/1970 | Cowles | 277/95 |
| 3,870,384 | 3/1975 | Ladin | 277/95 |
| 3,906,746 | 9/1975 | Haines | 277/95 |
| 3,975,028 | 8/1976 | Satsumabayshi et al. | 277/95 |

Primary Examiner—Russell R. Kinsey
Assistant Examiner—Paul J. Hirsch

[57] ABSTRACT

A grease reservoir is provided for the wear surfaces between a cotton harvester picker bar and its journal support in the picker drum. The reservoir is formed by upper and lower resilient seals acting to retain grease within the wear area and prevent entry of contamination into the reservoir area. A grease repository is further provided at the upper portion of the reservoir to assure lubrication of the vertical wear surfaces during harvesting operations and to extend periods between required maintenance.

3 Claims, 3 Drawing Figures

COTTON PICKER BAR LUBRICANT SEAL

BACKGROUND OF THE INVENTION

The present invention relates generally to cotton harvesters and more particularly relates to the bearing supports in which picker bars are journaled.

In conventional cotton pickers, as for example of the type shown in U.S. Pat. No. 3,245,210 to Hubbard, there is provided a vertically disposed picker bar journaled in the drum head of an upright cotton picking unit. The picker bar is mounted for rotation about a vertical axis within the journal support and for rotation with the drum head as it is rotated.

The interior wall surface of existing journal supports and their respective picker bar exterior wall surfaces in contact with respective journal supports are lubricated by grease or a similarly suitable lubricant by introducing that lubricant through the hollow picker bar via a circuitous route which for purposes of the present invention is not important.

To date however, the journal supports on cotton pickers have not been sealed and grease introduced between the wall surfaces or wear area has escaped to work downwardly in a relatively short working interval to leave the surfaces unlubricated. With picker speeds continually increasing due to improvements, and the desire of operators to realize higher rates of productivity, lubrication must be dependably provided between the wear surfaces.

Further, the lack of any structure for preventing entry of contamination into the wear area between the picker bar and journal support results in an increased wear rate and contributes along with the insufficient grease supply to premature wear and failure.

SUMMARY OF THE INVENTION

The present invention provides for a grease reservoir between the walls of the journal support and picker bar and for sealing in the grease supply to reduce journal support and picker bar wear. The sealed reservoir also prevents entry of dirt, sand and other contaminates into the wear area.

Lubricant seals are provided at both ends of the journal support to create a grease reservoir therebetween. Further, the journal support is circumferentially beveled at its upper end to provide a receptacle for a grease supply that can be available to supply the vertical wall or wear surfaces as necessary during picker operations. In this way availability of grease is assured and the time period between maintenance activities is extended to minimize premature failure of the journals and reduce expense of operations.

DESCRIPTION OF THE PREFERRED EMBODIMENT

The disclosures provided in the Hubbard Patent as well as U.S. Pat. No. 2,140,631 to Johnson may be referred to for understanding more fully the entire cotton picker. Accordingly, many of the details respecting the environment in which the instant improvement is utilized will be omitted.

Figure 1:
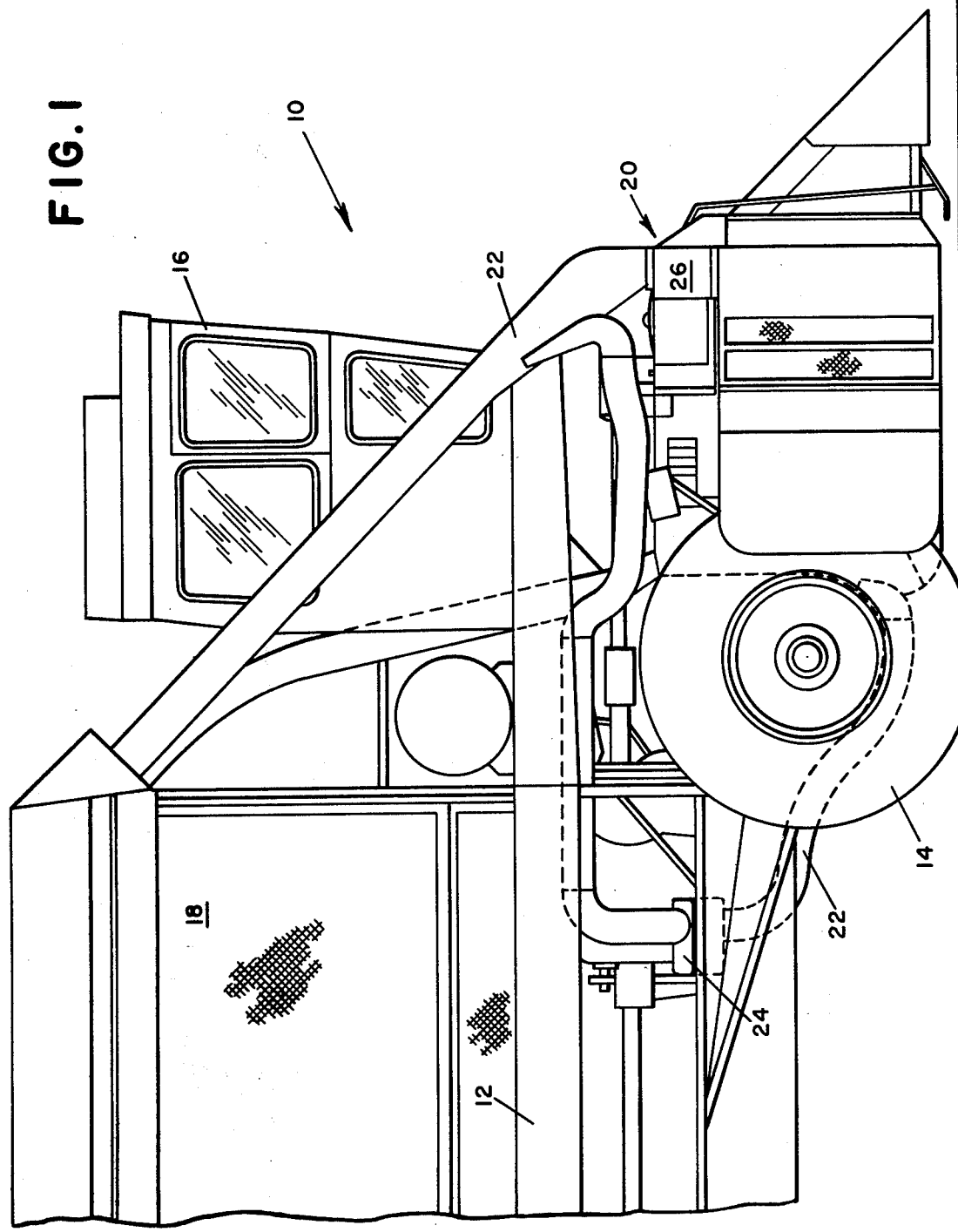
FIG. 1 is a side view of a cotton picker upon which the improvement is utilized.

The cotton picker 10 illustrated partially in FIG. 1 includes a main frame 12 carried by traction wheels 14 in the front and steering wheels at the rear (not shown). The frame 12 supports an engine, also not shown, connected to the wheels 14 in a conventional manner so as to advance the picker over a field of row planted cotton plants. An operator station 16 is supported on the forward part of the frame 12 with a material receiving basket 18 carried directly behind the station 16. At least one, and generally two or more forwardly positioned row harvesting units 20 pick the cotton and transfer it to the inclined delivery ducts 22.

A blower 24 is supported on the main frame 12 forwardly of the engine and connected thereto by a belt drive (not shown). The blower 24 provides to the ducts 22 the air stream wherein the picked cotton is delivered to the basket 18.

Figure 2:
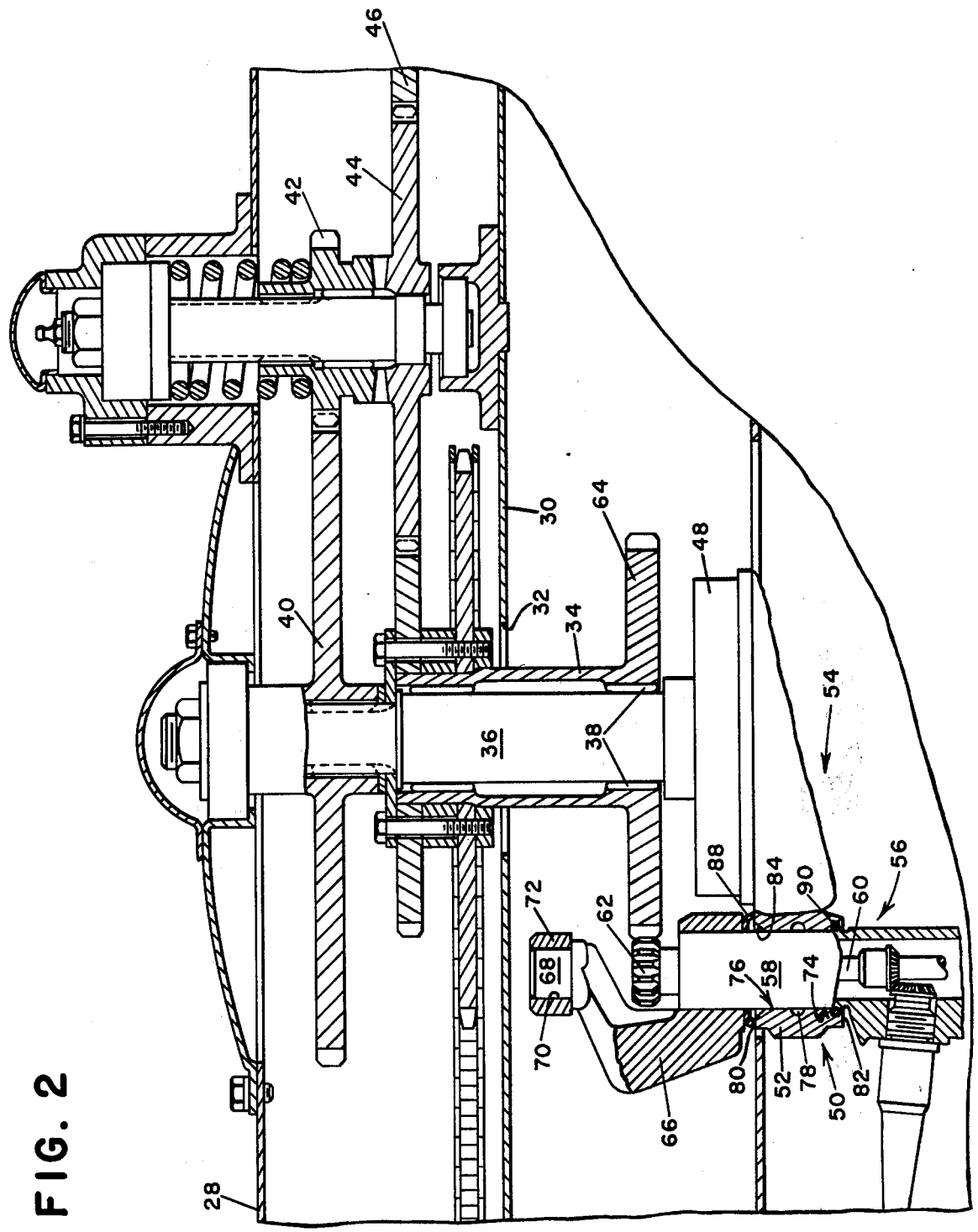
FIG. 2 is an enlarged partial view of the picking drum and illustrating the drive for a picker bar.

The picker unit 20 includes a housing 26 which is illustrated best in FIG. 2, includes a top wall 28 and a bottom wall 30. The bottom wall 30 has a circular opening 32 through which passes the vertical sleeve 34.

The sleeve 34 loosely surrounds the vertical drum shaft 36 supported by the housing 26 and is journaled in bearing 38 at its lower part. The upper portion of the shaft 36 has keyed thereto an input or driving gear 40 in constant mesh with gear 42. The gear 42 has fixed to its hub the gear 44 which is in constant mesh with driving pinion 46 driven by the main power source (not shown).

The lower part of the drive shaft 36 is connected to the upper portion of a drum head 48. The head 48 is coaxial with the drum shaft 36. The peripheral portion of the drum head 48 has formed therein a plurality of angularly spaced vertical bearing journals 50. Each bearing journal 50 includes a bearing cap 52 secured to the drum to form therewith the journal support. The drum head 48 is part of the picking drum unit designated generally by the numeral 54 and carries in each bearing journal 50 a hollow picker bar 56. Each bar 56 has a finished upper end 58 rotatably journaled in the bearing journal 50. Each bar 56 is hollow and encloses a spindle driving shaft 60. Each shaft 60 has a pinion 62 keyed to its upper end that meshes with sleeve carried pinion gear 64.

The upper end of each picker bar has keyed thereto a crank 66 which carries on its upper end a roller or follower 68. The followers 68 are seated in a cam track 70 in a plate 72, shown only partially in FIGS. 2 and 3, fixed to the under portion of the housing 26. Since the cam track 70 is of a different shape than and is offset from the circle on which lie the axes of the spindle driving shafts 60, the picker bar 56 will be caused to oscillate about the vertical axes at 50 as the entire drum unit 54 rotates about the axis of the drum shaft 36. This is, of course, conventional in cotton pickers and serves no part of the present invention. Should further details of such be desired, it may be had by reference to the aforementioned Hubbard and Johnson patents.

Figure 3:
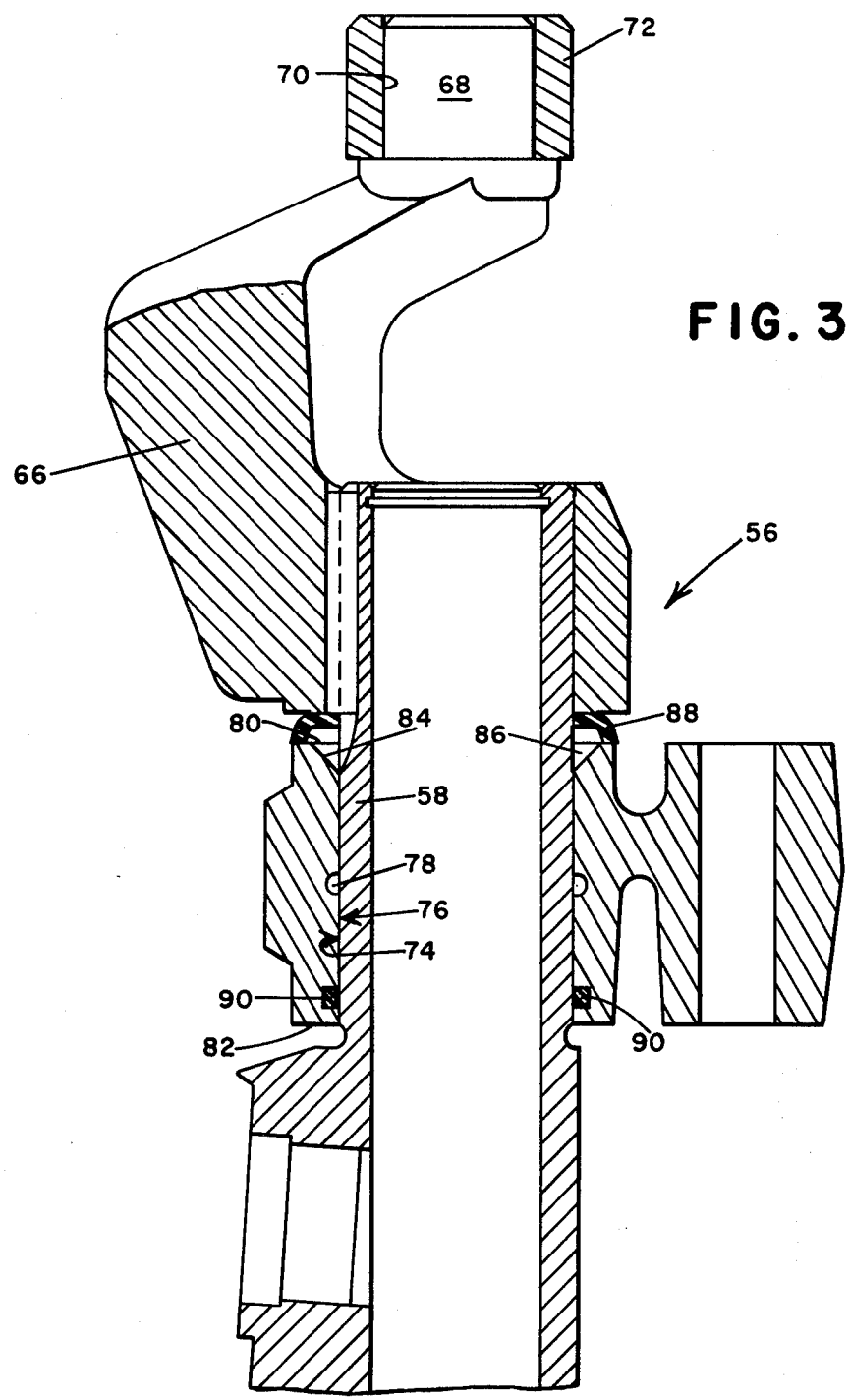
FIG. 3 is an enlarged partial view of a picker bar provided with a grease reservoir.

Looking now to FIG. 3, there is illustrated an enlarged view of the picker bar 56. To lubricate the walls or wear surfaces 74 and 76 of the picker bar 56 and bearing journal 50, grease is introduced through the lower part of the hollow picker bar 56 and between the wear surfaces 74, 76 through an annular opening 78 formed in the bearing journal 50 midway between its upper and lower surfaces 80 and 82. In existing nonsealed journal supports, grease introduced between the walls or wear surfaces 74 and 76 often works downwardly causing the upper portion to become dry. The current improvement provides for chamfered upper and inner edges 84 on the bearing journal 50 of the drum head 48 to provide a grease repository 86. A resilient annular grease seal having a C-shaped cross section designated by the number 88 tightly encircles each picker bar 56, rotates with the picker bar 56 and slidably abuts the upper surface 80 of the bearing journal 50 to form with the beveled edges 84 an enclosed grease supply 86. The seal 88 is held in place as it rotates by contact at its upper surface with the underside of picker bar crank 66. This grease supply is available to lubricate the vertical wear surfaces 74 and 76 during operations.

To seal the grease between the upper and lower horizontal surfaces 80 and 82 of each bearing journal 50, an O-ring or similar seal 90 is provided in the lower interior surface of the journal support 50. This reservoir then provided between the upper seal 88 and lower O-ring contains the grease required for oscillation of the picker bar 56 in the bearing journal 50 and also prevents entry of dirt, sand or other contamination during operation. With the improved grease reservoir formed by the seals 88 and 90, lubrication of the vertical wear surfaces 74 and 76 is assured and the introduction of contamination is minimized. Accordingly, life and reliability of the wall during harvesting operations is improved.

I claim:

1. In a cotton picker drum having an upper horizontal drum head rotatable about a vertical axis and having a plurality of angularly spaced vertical cylindrical openings adjacent its periphery, said drum further having a plurality of upright picker bars, one for each cylindrical opening, and having upper cylindrical shaped ends extending through and journaled in said openings, and an inlet for introducing lubricant under pressure between the walls of the aforesaid cylindrical ends and the walls forming the cylindrical openings, the improvement residing in means for sealing and retaining lubricant between the walls of each of said ends and said openings, comprising: an annular opening below the inlet and in the wall of the cylindrical opening; an annular seal seated in the opening and engaging the wall of the cylindrical shaped end for preventing movement of lubricant therebelow; an upper flexible and annular sealing member above the drum head having an annular inner edge bearing against the upper end of the picker bar with sufficient pressure to cause the seal to rotate with the picker bar, and extending from the edge first radially and then downwardly to an annular surface that bears in sealing relation against the upper surface of the drum head to provide above the drum head a lubricant chamber for receiving lubricant forced upwardly from the inlet.

2. In a cotton picker drum, an upper horizontal drum head rotatable about a vertical axis and having a plurality of angularly spaced vertical cylindrical openings adjacent its periphery, the walls forming each of said openings being radially enlarged at the upper surface of the head; a plurality of upright picker bars, one for each cylindrical opening, and having upper cylindrical shaped ends extending through and journaled in said openings; lubricant inlets in the drum head for introducing lubricant under pressure between the walls of the aforesaid cylindrical ends and the walls of the cylindrical openings; an annular opening below the inlet and in each of the walls (forming) of the cylindrical openings; an annular seal seated in (the) each respective opening (s) and engaging the walls of the respective cylindrical shaped ends for preventing movement of lubricant therebelow; an upper flexible and annular sealing member for each of said picker bars above the drum head and having an annular inner edge bearing against the upper end of a picker bar with sufficient pressure to cause the seal to rotate with the picker bar, and extending from the edge first radially and then downwardly to an annular surface that bears in sealing relation radially outwardly of the enlarged opening at the surface of the head and against the upper surface of the drum head to provide at the upper surface of the drum head a lubricant chamber for receiving lubricant forced upwardly from the inlet.

3. The invention described in claim 2 further characterized by each picker bar having connected on its end a drive element for rotating the picker bar, and by said driving element having an undersurface spaced from the upper surface of the drum head and bearing against an upper surface of the upper sealing member to thereby retain the aforesaid lower surface of the sealing member in sealing contact with the upper surface of the drum head.

* * * * *

UNITED STATES PATENT OFFICE
CERTIFICATE OF CORRECTION

Patent No. 4,133,166      Dated 9 January 1979

Inventor(s) Arthur L. Hubbard

It is certified that error appears in the above-identified patent and that said Letters Patent are hereby corrected as shown below:

Column 4, line 21, delete "(forming)"

Column 4, line 22, delete "(the)"

Column 4, line 23, delete "(s)"

Signed and Sealed this

Eighth Day of July 1980

[SEAL]

Attest:

Attesting Officer

SIDNEY A. DIAMOND

Commissioner of Patents and Trademarks